(12) United States Patent
Lacouture et al.

(10) Patent No.: US 7,181,473 B1
(45) Date of Patent: Feb. 20, 2007

(54) IDENTIFYING FILES WITHIN A NAMESPACE

(75) Inventors: Jacob P. Lacouture, Redmond, WA (US); Jonathan M. Cargille, Seattle, WA (US); Surendra Verma, Bellevue, WA (US); Brian D. Andrew, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 563 days.

(21) Appl. No.: 10/293,425

(22) Filed: Nov. 12, 2002

(51) Int. Cl.
*G06F 17/30* (2006.01)

(52) U.S. Cl. .......................... 707/202; 707/201; 714/2

(58) Field of Classification Search ................ 707/200, 707/205
See application file for complete search history.

(56) References Cited

U.S. PATENT DOCUMENTS

| | | | | |
|---|---|---|---|---|
| 5,410,684 A | * | 4/1995 | Ainsworth et al. ........... | 714/18 |
| 5,835,764 A | * | 11/1998 | Platt et al. ................... | 718/101 |
| 5,991,772 A | * | 11/1999 | Doherty et al. ............. | 707/202 |
| 6,651,077 B1 | * | 11/2003 | East et al. ................... | 707/204 |
| 6,856,993 B1 | * | 2/2005 | Verma et al. ............... | 707/101 |
| 2004/0122849 A1 | * | 6/2004 | Nelson ........................ | 707/102 |
| 2004/0122946 A1 | * | 6/2004 | Hu et al. ..................... | 709/225 |
| 2004/0143597 A1 | * | 7/2004 | Benson et al. ........... | 707/104.1 |

* cited by examiner

*Primary Examiner*—Jean M. Corrielus
(74) *Attorney, Agent, or Firm*—Workman Nydegger (57) ABSTRACT

An external request to perform a file operation within a resource manager is received. The resource manager selects a resource manager file identifier that is to be an attribute of a file associated with the file operation. The file operation and the resource manager file identifier are logged in a log entry of a log. Subsequent to logging the log entry, the log entry is accessed during a forward pass through the log, for example, during a roll-forward recovery. If it is determined that the resource manager file identifier in the log entry is assigned to the file, the first log entry is not processed. On the other hand, if it is determined that the resource manager file identifier in the log entry is not assigned to the file, the resource manager file identifier is selected to be assigned to a file when the first log entry is processed.

28 Claims, 3 Drawing Sheets

IDENTIFYING FILES WITHIN A NAMESPACE

BACKGROUND OF THE INVENTION

1. The Field of the Invention

The present invention relates to identifying files that are to be associated with corresponding file operations. More specifically, the present invention relates to systems, methods, and computer program products for selecting file identifiers that have an increased likelihood of being able to appropriately identify a file during a forward pass though a log.

2. Background and Relevant Art

Computer systems and related technology affect many aspects of society. Indeed, the computer system's ability to process information has transformed the way we live and work. Computer systems now commonly perform a host of operations (e.g., database management, scheduling, and word processing) that prior to the advent of the computer system were performed manually. Many operations performed at a computer system include the manipulation of files, such as, for example, creating files, deleting files, modifying the contents of files, and modifying the attributes files (hereinafter collectively referred to as "file operations").

Some computer systems are communicatively coupled to a number of different storage locations where files (as well as other data) can persist even when power to the computer system is removed. For example, a computer can be communicatively coupled to a number of magnetic hard disks or a number of logically distinct portions of the same magnetic hard disk (e.g., a number of different volumes or partitions). A computer system coupled to a number of storage locations may perform file operations that result in creating, deleting, or modifying files at each of the number of storage locations. When a system fault occurs (e.g., a power surge or component malfunction), recent changes in one file space (e.g., the effects of file creations, file deletions, and file modifications) may be lost while recent changes in other file spaces are unaffected. For example, a malfunctioning disk head used to access a first magnetic hard disk would typically not affect files at other magnetic hard disks.

To protect against loss of data, a computer system can maintain a log of the file operations that are performed on files at a storage location. When a computer system is communicatively coupled to a number of storage locations, the computer system can maintain a log for each storage location. In some cases, a computer system will maintain a log of file operations that are performed on some files but not other files or will maintain separate logs for different groups of files stored at the same storage location.

A log can be stored at a storage location where the files affected by file operations recorded in the log are also stored. For example, files and a corresponding log may be stored on the same disk partition. On the other hand, a log can also be stored at storage location that is different than the storage location where the files affected by file operations recorded in the log are stored. For example, files may be stored at a first magnetic hard disk and a corresponding log stored at a second magnetic hard disk.

When a request to perform a file operation is received, data associated with the request can be loaded into system memory included in a computer system. System memory is typically Random Access Memory ("RAM"), the contents of which are lost if power to the RAM is removed. If a file operation is to be logged, some portion of the loaded data is eventually flushed to a log entry (hereinafter referred to as "log data") and some portion of the loaded data is eventually flushed to a file (hereinafter referred to as "file data"). Log data flushed to a log entry is typically sufficient to recreate the file operation indicated in the log entry. For example, a log entry for a file creation operation typically includes sufficient log data to recreate the file creation operation. In many logging mechanisms, log data is flushed to log entries before corresponding file data is flushed to files. Thus, there is a reduced chance that data could be lost due to system fault or power failure occurring after file data was flushed but before corresponding log data was flushed. That is, there is a reduced chance that a file operation could be performed without a corresponding log entry, which includes sufficient log data to recreate the file operation, being recorded to the log.

If at some time a storage location transitions into an inconsistent state as a result of a system fault or power failure (e.g., data in memory is not flushed to persistent storage), entries from the log can be processed to transition the storage location out of the inconsistent state. An inconsistent state can result, for example, when a transaction is open at the time of a system fault or power failure. To restore integrity, log entries between a more recent point in time and a more distant point in time can be processed to rollback any uncommitted transactions.

In some cases, log entries between a more distant point in time and a more recent point in time are processed sequentially (hereinafter referred to as "rolling forward") to transition a storage location out of an inconsistent state. For example, during a roll-forward recovery, log entries can be processed sequentially to recreate and reapply previously performed file operations. However, to appropriately recreate and reapply file operations, some mechanism must be provided to identify files that are associated with the file operations indicated in log entries.

One mechanism for identifying a file during a roll-forward recovery is to include the filename of a file in a log entry for a corresponding file operation. For example, if a file creation operation created a file with a filename of "resume.txt," the filename "resume.txt"could be included in a log entry for the file creation operation. Then, if the log entry was subsequently processed to recreate the file creation operation, a file could again be created with the filename "resume.txt." However, identifying files by including filenames in log entries can lead to processing inefficiencies.

For example, a first file may be created with a first file name, a substantial amount of data added to body of the first file and, the first file subsequently renamed to a second file name. Log entries containing sufficient log data to recreate each of these three file operations (i.e., file creation operation, file content modification operation, and file attribute modification operation) may be sequentially written to a log.

Unfortunately during a roll-forward recovery, there are limited mechanisms for determining if the first file is intact at the time the log entry for the file creation operation is processed. When the log entry for the file creation operation is accessed, a check may be performed to determine if a file with the first file name exists. If there is no file with the first file name, the accessed log entry can be processed to create a new file with the first file name.

Since the first file has been renamed (and thus a file with the first file name does not exist), the check will determine that the log entry should be processed to create a second file with the first file name. Further, corresponding checks may determine (since a file with the first file name now exists)

that the file content modification operation and file attribute modification operation should also be processed. However, processing each of the three log entries is redundant because whether or not the log entries are processed the resulting state of the storage location is essentially the same. That is, while the first file exists, there would be little, if any, benefit, to creating a second file with the first file name, adding the substantial amount of data to the second file, and then renaming the second file to the second file name. When the second file is renamed to the second file name, it may be that the data contained in the first file is overwritten with substantially the same data. In some cases, it may also be determined that renaming the second file is unnecessary due to the presence of the first file, and the second file is therefore deleted. However, in either case redundant data is written to the second file leading to processing inefficiencies.

Another mechanism for identifying a file during a roll-forward recovery is to include the file system identifier of the file in a log entry for a corresponding file operation. Unique file system identifiers are typically assigned to files by an operating system at the time the files are created. In some instances, an entry (including a file system identifier) for a created file is inserted in a file table and the index of that entry can then be used to identify the file for as long as the file exists. Users and application programs are typically prevented from modifying file system identifiers and file tables. As a result, there is a reduced chance that a file system identifier assigned to a file could be changed after the file is created.

Typically, separate file tables are maintained for each partition. Thus, as files are created and deleted on different partitions, entries can be inserted into and removed from the corresponding file tables. In logging mechanisms that flush log data before flushing file data this can be problematic. For example, when a file creation operation is to be performed, a first file system identifier can be allocated for assignment to the created file and can be loaded into system memory along with other log data and file data. Log data, including the first file system identifier, is then flushed from system memory to a first log entry.

However, before file data is flushed from system memory, and the first file system identifier actually assigned to a created file, a system fault affecting the storage location (e.g., a disk drive partition) where the file was to be created may occur. This can be problematic as most operating systems assign file system identifiers in a non-deterministic manner. That is, there is no guarantee that the first file system identifier flushed to the first log entry will in fact be available when the first log entry is subsequently accessed. Since the file creation operation was not in fact performed, the allocated first file system identifier can be released and subsequently non-deterministically assigned to another file. During a rollback, the first log entry can be processed to attempt to reverse any inconsistencies resulting from the system fault. This can include reversing inconsistencies resulting form the failed file creation operation.

However, it may be difficult to appropriately identify inconsistencies as the first file system identifier in the first log entry may now be assigned to another file. Further, even if the first file system identifier is available there is no guarantee that an operating system will appropriately re-assign the first file system identifier. Consequently, errors can occur when attempting to reverse inconsistencies resulting from the failed file creation operation. Further, this can potentially cause a rollback to abort. Thus, the affected storage location may not be able to be transitioned out of an inconsistent state.

Therefore, systems, methods, and computer program products, for appropriately identifying a file during a pass through a log would be advantageous.

BRIEF SUMMARY OF THE INVENTION

Methods, systems, and computer program products are described for identifying files within a namespace. An external request to perform a file operation within a resource manager is received. An external request may be a request that originates outside a file system and requests that a file operation, such as, for example, a file creation, deletion, or modification be performed within the resource manager.

A resource manager file identifier that is to be an attribute of a file associated with the file operation is selected. This can include a resource manager selecting a resource manager file identifier for the file based on user-configurable rules. In some embodiments, a link to a known location (e.g. a directory) within the resource manager is selected for the file. The known location can be a location where resource manager file identifiers are stored. The link can include data used to search the known location for resource manager file identifiers.

The file operation along with the resource manager file identifier are logged in a first log entry of a log. This can include logging a link that was selected for the file. The log can maintain a record of the file operations that are performed within the resource manager. If the file operation indicated in the external request is successfully performed within the resource manager, the link can be assigned as an attribute of the file and a resource manager file identifier corresponding to the link can be stored in the known location.

Subsequent to logging the first log entry, the first log entry is accessed during a forward pass through the log. Accessing the first log entry can include accessing a link that was previously logged in the log entry. A forward pass through the log may be performed as part of a roll-forward recovery to transition the resource manager out of an inconsistent state.

After accessing the resource manager file identifier from the first log entry, it is determined if the resource manager file identifier in the first log entry is assigned to the file. A link accessed from the first log entry can be used to search the known location. If the file operation was successfully performed within the resource manager, there is an increased likelihood that the resource manager file identifier is stored in the known location and is thus assigned to the file. However, if for some reason the file operation was not successfully performed within the resource manager (even though the first log entry was successfully logged), there is a decreased likelihood that the resource manager file identifier is stored in the known location. The resource manager file identifier not being stored in the known location is an indication that the resource manager file identifier is not assigned to a file (including the file associated with the file operation).

Resource manager file identifiers can be used to appropriately identify a file from a log entry even if the file was renamed after the log entry was logged. Thus, the potential for performing redundant file operations may be significantly reduced. Further, resource manager file identifiers are maintained within the resource manager and selected for (and assigned to) files within the resource manager. Thus, there is a reduced chance that a file outside of the resource manager might be assigned a resource manager file identifier that was logged for a file operation performed at the resource manager.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to systems, methods, and computer program products for identifying files within a namespace. An external request to perform a file operation within a resource manager is received, such as, for example, by referencing a pre-existing mapping of locations to the resource manager. The resource manager selects a resource manager file identifier to be an attribute of a file associated with the file operation. For example, when a file creation operation is performed, the resource manager can select a resource manager file identifier to be an attribute of a created file that results from performing the file creation operation. An indication of the file operation (e.g., instructions that can be used to recreate the file operation) and the resource manager file identifier are logged in a first log entry of a log. This can include writing the indication of the file operation and the resource manager file identifier to a log maintained by the resource manager.

Subsequently, the first log entry is accessed during a forward pass through the log, such as, for example, as part of a roll-forward recovery performed at the resource manager. It is determined if the resource manager file identifier in the first log entry is assigned to the file. The resource manager can maintain a record of resource manager file identifiers that are assigned to files within the resource manager. During a forward pass through the log, it can be determined if the resource manager file identifier assigned as an attribute of the file is located in the maintained record. When the resource manager file identifier is located in the maintained record, this can indicate that the file is still stored within the resource manager (even if the file name has been changed). As a result, there is little, if any, need to process log entries that would reconstruct the file operations (or to reapply the file operations).

When the resource manager file identifier is not located in the maintained record, this can indicate that the file is not stored within the resource manager. As a result, a file can be generated and assigned the same resource manager file identifier that was assigned when the file operation was performed in response to the external request. Thus, recreated file operations that result from processing log entries can access the file using the same resource manager file identifier (even if a file system identifier associated with the recreated file would be different).

The embodiments of the present invention may comprise a general-purpose or special-purpose computer system including various computer hardware components, which are discussed in greater detail below. Embodiments within the scope of the present invention also include computer-readable media for carrying or having computer-executable instructions, computer-readable instructions, or data structures stored thereon. Such computer-readable media may be any available media, which is accessible by a general-purpose or special-purpose computer system.

By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "network" is defined as any architecture where two or more computer systems may exchange data with each other. When information is transferred or provided over a network or another communications connection (either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions.

In this description and in the following claims, a "computer system" is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a computer network. Likewise, a computer system may include a single physical device (such as a mobile phone or Personal Digital Assistant "PDA") where internal modules (such as a memory and processor) work together to perform operations on electronic data.

In this description and in the following claims, a "logical communication link" is defined as any communication path that may enable the transport of electronic data between two entities such as computer systems or modules. The actual physical representation of a communication path between two entities is not important and may change over time. A logical communication link may include portions of a system bus, a local area network, a wide area network, the Internet, combinations thereof, or portions of any other path that may facilitate the transport of electronic data. Logical communication links may include hardwired links, wireless links, or a combination of hardwired links and wireless links. Logical communication links may also include software or hardware modules that condition or format portions of data so as to make them accessible to components that implement the principles of the present invention. Such components may include, for example, proxies, routers, firewalls, or gateways. Logical communication links may also include portions of a Virtual Private Network ("VPN").

In this description and in the following claims, a "resource manager" is defined generally to include resource manager data as well as resource manager modules that manage the resource manager data. A resource manager module can receive requests from other modules requesting access to resource manager data. Likewise, a resource manager module can respond to requests for access to resource manager data by providing the requesting module with access to resource manager data. For example, other modules may request access to files that are managed by a resource manager module. In response, the resource manager module may provide the other modules access to the files.

In this description and in the following claims, a "partition" is defined as a logical representation of a portion of the available storage at a mass storage device, such as, for example, a portion of the sectors of a magnetic hard disk that are available for storing data. A single mass storage device can be divided into one or more partitions. When a single mass storage device has a single partition, the portion of the available storage logically represented by the single partition may essentially be all of the available storage at the mass storage device. However, a mass storage device can have also a single partition that logically represents less than all of the available storage at the mass storage device. When a single mass storage device has a plurality of partitions, each partition can be configured to be logically separate from other partitions on the single mass storage device such that separate partitions appear as separate disk drives.

Configuring a single mass storage device to have a plurality of partitions may be desirable when a computer system associated with the single mass storage device is to include a plurality of operating systems. For example, a first partition can be configured for use by a first operating system and a second partition can be configured for use by a second operating system. It may also be that a single partition spans portions (or all) of the available storage at a plurality of mass storage devices. For example, a partition of 120 gigabytes may logically represent the entire available storage areas of two magnetic hard disks that each has 40 gigabytes of available storage space and half the available storage area of a third magnetic hard disk that has 80 gigabytes of available storage.

In this description and in the following claims, a "file system" is defined as a system that manages files stored on a partition. Portions of a file system, such as, for example, a file table (e.g. a File Allocation Table ("FAT") or a Master File Table ("MFT")), which maintains an index of files stored on a partition, can be stored on the partition along with the files that are managed by the file system. An operating system or other software component may interact with a file system to facilitate the management of files on a partition. For example, an operating system may read data from a file table to determine how to access a file. The principles of the present invention may be practiced using a wide variety of file systems, such as, for example, FAT file systems (FAT16, FAT32, and VFAT), High Performance File System ("HPFS"), NT File System ("NTFS"), Hierarchical File System ("HFS"), Network File system ("NFS"), Netware File System ("NWFS"), Logging File Systems ("LFS"), and Unix File Systems.

In this description and in the following claims, "formatting" is defined as preparing a partition such as, for example, a partition of a magnetic hard disk, for reading and writing by software components (e.g., an operating system). Formatting can include installing portions of a file system, such as, for example, a file table, on a partition.

In this description and in the following claims, a "file" is defined as a group of data that is identified by a representative identifier. A representative identifier can be a file name or file identifier and can be assigned by a user or a module of a computer system. A plurality of representative identifiers, such as, for example, a plurality of hard and/or soft links to a file, can be used to identify a file. A group of data identified by a representative identifier may be viewed as "contents of" and/or "being in" a file. For example, a group of text data identified by the file name "resume.txt" may be viewed as contents of the resume.txt file. File is defined to include groups of data used to organize other files into a hierarchical structure (e.g. a directory).

In this description and in the following claims, a "file attribute" is defined as data that indicates a property a file. A file attribute may indicate, for example, that a file is read-only, the date a file was created, the file name of a file, a file system identifier assigned to the file, the size of a file, etc. File attributes can remain associated with a file when a file is transferred between storage locations. For example, when a file is moved from a first directory to a second directory, the file attributes associated with the file when it was stored in the first directory can continue to be associated with the file when it is stored in the second directory. File attributes for a file can be maintained in a file table.

In this description and in the following claims, a "file operation" is defined as an operation that results in creation of a file, modification to the contents of a file, modification to the attributes of a file, or deletion of a file. Creating a file is defined to include transferring a file from a location external to a resource manager to the resource manager. Deleting a file is defined to include moving a file from a resource manager to a location external to the resource manager.

In this description and in the following claims, a "transaction" is defined as one or more operations that are treated as an atomic unit. That is, it is desirable that either all the one or more operations be performed or none of the one or more operations be performed. A single transaction can cause one or more operations (including file operations) to be performed on one or more resources (including files) that are managed by a resource manager. For example, a single transaction can cause a first file to be created and a second file to be deleted at a first resource manager, two rows of a database to be modified and a third file deleted at a second resource manager, and a fourth file to be modified at a third resource manager.

In this description and in the following claims, a "forward pass through a log" is defined as sequentially processing log data from a first more distant point in time in a log to a second more recent point in time in the log. A forward pass through a log is defined to include processing log data between intermediate points in time in a log. For example, if a log contains a plurality of log entries that were written to the log between 5:00 PM and 6:00 PM, a forward pass through the log may include processing only log entries that were written to the log between 5:15 PM to 5:20 PM.

During a forward pass through a log, operations (including file operations) that were previously performed at a resource manager can be reconstructed. For example, as operations are performed at a resource manager, the resource manager can write log data to a log. If at some time a fault occurs, it may be desirable to return the resource manager to a state similar to some previous state before the fault. To achieve this similar state the resource manager can perform a roll-forward recovery. As part of the roll-forward recovery, a resource manager can process log data in the log to reconstruct operations that were previously performed at the resource manager. Reconstructed operations can then be reapplied at the resource manager to transition the resource manager into the similar state.

In this description and in the following claims, a "fault" is defined as an unexpected event that causes a module (either hardware or software) of a computer system to transition into an undesirable state. Some faults can cause data at a computer system to be lost. For example, an unexpected power failure can cause data stored in Random Access Memory to be lost. Other faults can cause data at a computer system to become corrupted. For example, an unexpected malfunction of the head on a magnetic hard disk can result in data being improperly stored. It should be understood, that an unexpected event that causes an undesirable state in one type of module might not necessarily cause an undesirable state in another type of module. For example, an unexpected power failure may cause a fault in a Random Access Memory ("RAM") module but would not necessary cause a fault at a magnetic hard disk.

Those skilled in the art will appreciate that the invention may be practiced in network computing environments with many types of computer system configurations, including, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired links, wireless links, or by a combination of hardwired and wireless links) through a network, both perform tasks. In a distributed system environment, program modules may be located in both local and remote memory storage devices.

Figure 1:
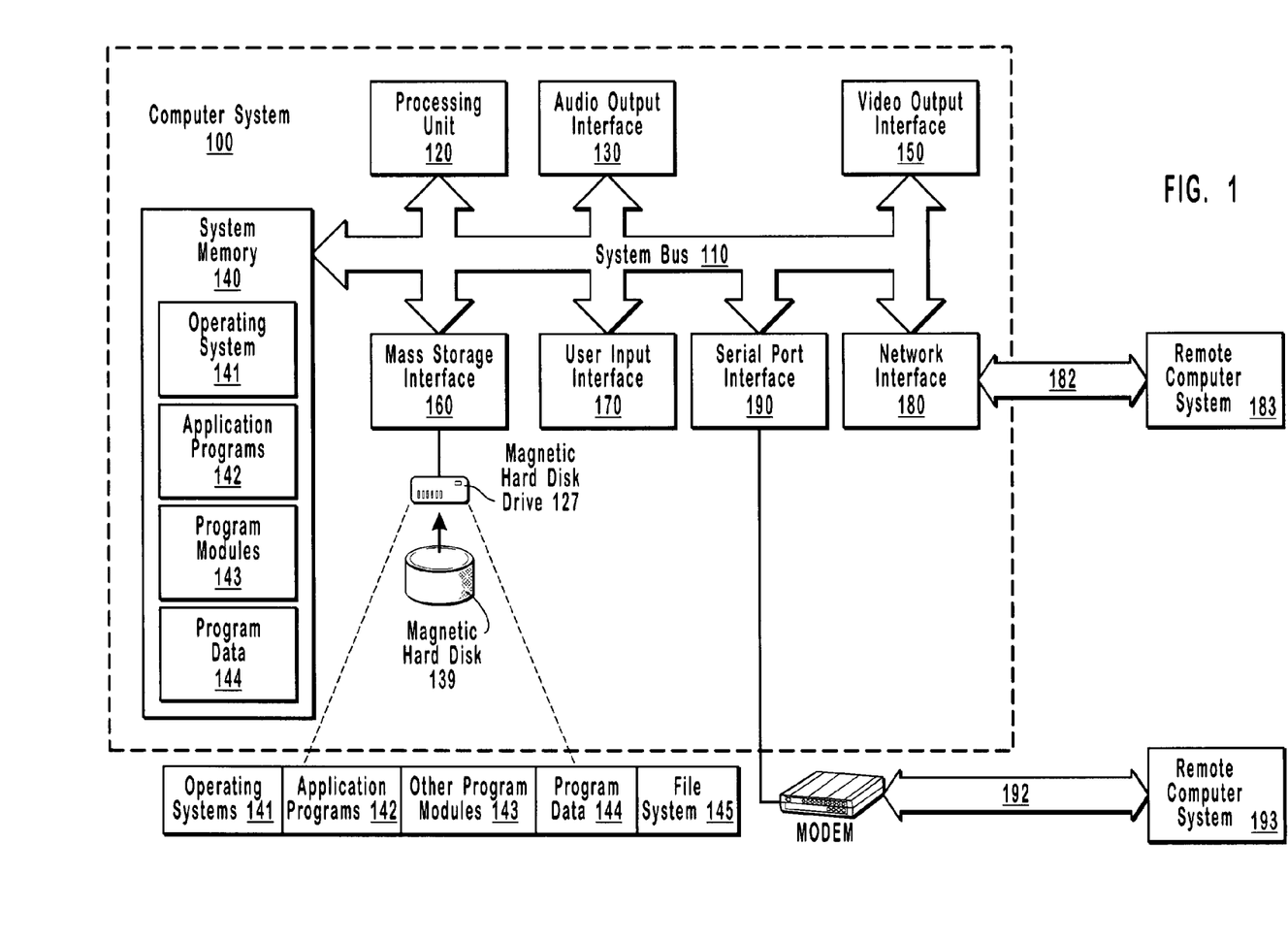
FIG. 1 illustrates an example of a computer system that provides a suitable operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing steps of the methods disclosed herein. The particular sequences of such executable instructions or associated data structures represent examples of corresponding acts for implementing the functions described in such steps.

With reference to FIG. 1, a suitable operating environment for the principles of the invention includes a general-purpose computer system in the form of a computer system 100. Computer system 100 may be a personal computer that has been adapted to perform the operations disclosed herein. It should be understood that computer system 100 is merely an example of one possible computer system configuration that can be used to practice the principles of the present invention.

Computer system 100 includes a user input interface 170 that receives information from an input device, such as, for example, a keyboard, microphone, or mouse. An input device can be coupled to user input interface 170 so as to enable the entry of information. An input device can transfer information over such a coupling in response to preprogrammed data or user manipulation of the input device.

Computer system 100 can also include video output interface 150, which provides a video output signal to external video display devices. Computer system 100 may be integrally positioned with or separate from a video display device, such as, for example, a color or monochrome computer monitor. A video display device can be coupled to video output interface 150 so as to receive a provided video output signal.

Similarly, computer system 100 includes an audio output interface 130 that provides an audio output signal to external audio output devices. Computer system 100 may also be integrally positioned with or separate from an audio system, which includes a speaker or other device capable of emitting sound data. An audio system can be coupled to audio output interface 130 so as to receive a provided audio output signal.

Computer system 100 includes processing unit 120, which allows for complex and flexible general-purpose processing capabilities. Processing unit 120 executes computer-executable instructions designed to implement features of computer system 100, including features of the present invention. Processing unit 120 is coupled to system bus 110, which also interconnects various other system components, including system memory 140.

System memory 140 generally represents a wide variety of volatile and/or non-volatile memories and may include types of memory previously discussed. However, the particular type of memory used in computer system 100 is not important to the present invention. Program code means comprising one or more program modules may be stored in system memory 140. The one or more program modules may include an operating system 141, one or more application programs 142, other program modules 143, and program data 144.

Computer system 100 also includes magnetic hard disk drive 127 for reading from and writing to magnetic hard disk 139. The magnetic hard disk drive 127 is connected to system bus 110 by mass storage interface 160. Magnetic hard disk drive 127 and magnetic hard disk 139 provide nonvolatile storage of computer-executable instructions, data structures, program modules and other data for computer system 100. For example, magnetic hard disk 139 can store one or more program modules including operating system 141, application programs 142, other program modules 143, and program data 144. Magnetic hard disk 139 can also store a file system, such as, for example, file system 145, that is used by operating system 141, application programs 142, and/or program modules 143 to organize and keep track of files stored on magnetic hard disk 139. Although the example environment described herein employs magnetic hard disk 139, other types of computer-readable media (and corresponding drives) for storing data can be used, including removable magnetic disks, optical disks, removable optical disks, magnetic cassettes, flash memory cards, digital versatile disks, Bernoulli cartridges, RAMs, ROMs, and the like.

Computer system 100 can be network connectable to networks, such as, for example, an office-wide or enterprise-wide computer network, an intranet and/or the Internet. Computer system 100 can exchange data with external sources, such as, for example, remote computer systems and/or databases over such a network.

Computer system 100 includes network interface 180, through which computer system 100 receives data from external sources and/or transmits data to external sources. As illustrated in FIG. 1, network interface 180 facilitates the exchange of data with remote computer system 183 via logical communication link 182. Logical communication link 182 represents a portion of a network, and remote computer system 183 represents a node of the network. Remote computer system 183 can be an electronic messaging server that receives and stores electronic messages for recipients, including recipients that utilize computer system 100 to access electronic messages.

Likewise, computer system 100 includes serial port interface 190, through which computer system 100 receives data from external sources and/or transmits data to external sources. Serial port interface 190 is coupled to modem 191 via logical communication link 159, through which computer system 100 receives data from and/or transmits data to external sources. As illustrated in FIG. 1, serial port interface 190 and modem 191 facilitate the exchange of data with remote computer system 193 via logical communication link 192. Logical communication link 192 represents a portion of a network, and remote computer system 193 represents a node of the network. Remote computer system 193 can be an electronic messaging server that receives and stores electronic messages for recipients, including recipients that utilize computer system 100 to access electronic messages.

Alternatively, computer system 100 can exchange data with external sources through other interfaces, such as, for example, a parallel port, a game port, or a universal serial bus ("USB") port.

It should be understood that the described network connections are merely examples. It would be apparent to one skilled in the art, after having reviewed this description, that a wide variety of network connection techniques, in addition to those described with reference to FIG. 1, may be used to facilitate the exchange of data between computer system 100 and external sources.

While FIG. 1 represents a suitable operating environment for the present invention, the principles of the present invention may be employed in any computer system that is capable of, with suitable modification if necessary, implementing the principles of the present invention. The environment illustrated in FIG. 1 is illustrative only and by no means represents even a small portion of the wide variety of environments in which the principles of the present invention may be implemented.

In accordance with the present invention, resource manager modules, as well as associated data, including files, file data, file attributes, logs, log entries, resource manager data, resource manager file identifiers, logged resource manager file identifiers, logged file operations, and file tables, may be stored and accessed from any of the computer-readable media associated with computer system 100. For example, portions of such modules and portions of associated program data may be included in operating system 141, application programs 142, program modules 143 and/or program data 144, for storage in system memory 140 and/or magnetic hard disk 139. Further, portions of such modules and portions of associated program data may be included in file system 145 for storage at magnetic hard disk 139.

In a networked environment, program modules depicted relative to computer system 100, or portions thereof, can be stored in remote memory storage devices, such as, for example, system memory and/or mass storage devices associated with remote computer system 183 and/or remote computer system 193. Execution of such modules may be performed in a distributed environment as previously described.

Figure 2:
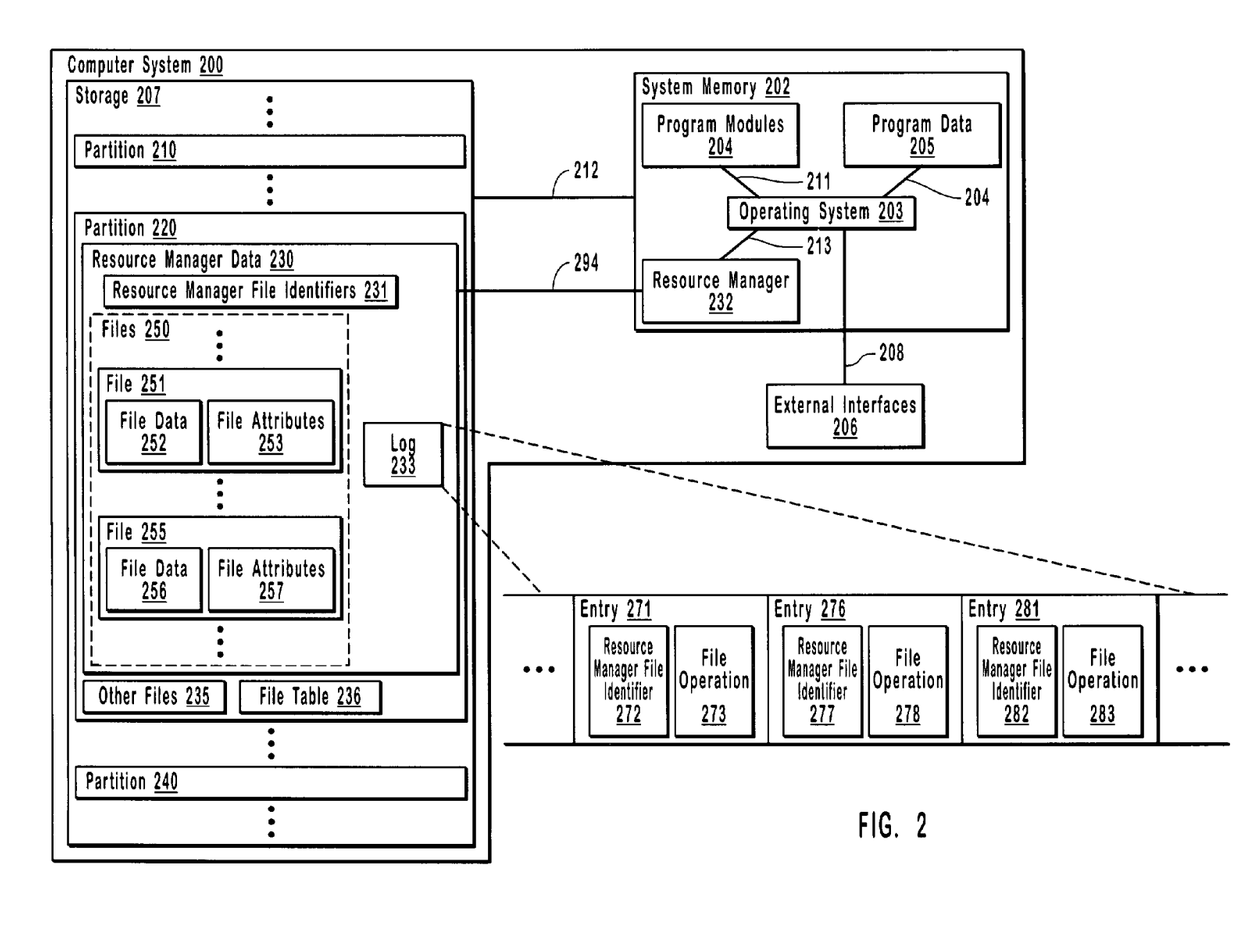
FIG. 2 illustrates an example of some of the functional components that can facilitate identifying files within a namespace.

FIG. 2 illustrates an example of some of the functional components that can facilitate identifying files within a namespace. Illustrated in FIG. 2 is computer system 200, which includes storage 207, system memory 202, and external interfaces 206. As illustrated in FIG. 2, storage 207 includes a plurality of partitions (e.g., partitions 210, 220, and 240) each of which can logically represent storage areas of a mass storage device (or mass storage device.) Alternately, storage 207 can include a single partition logically representing storage areas of a mass storage device (or mass storage devices). Storage 207 can store data used by modules of computer system 200, including modules for implementing the principles of the present invention. More particularly, storage 207 can be used to persist data that is flushed from system memory 202 (e.g. from program data 205) to log 233 and files 250.

Included in system memory 202 are operating system 203, program modules 204 program data 205, and resource manager module 232. Operating system 203 can communicate with program modules 204, program data 205, and resource manager module 232 via corresponding logical communication links 211, 209, and 213. Modules in system memory 202 can communicate generally with storage 207 via logical communication link 212. Operating system 203 can load modules and data (including those of program modules 204 and program data 205) from storage 207, via logical communication link 212, into system memory 202. Likewise, operating system 203 can remove program modules and program data (including those of program modules 204 and program data 205) from system memory 202.

Operating system 203 may load modules and data into system memory 202 and remove modules and data from system memory 202 in response to commands received from external interfaces 206. Removing modules and/or data from system memory 202 includes moving modules and/or data from system memory 202 to storage 207 for storage. External interfaces 206 collectively represent interfaces for receiving commands and sending responses to commands (e.g., user interface 170, audio output interface 130, video output interface 150, serial port interface 190, and network interface 180)

Operating system 203 can also load resource manager module 232 into system memory 202 and remove resource manager module 232 from system memory. While resource manager module 232 can be loaded into system memory 202 from a location within resource manager data 230, resource manager module 232 may also be loaded into system memory 202 from other locations within partition 220 or from locations within other partitions (e.g., partition 210 or 240). Resource manager module 232 can communicate directly with resource manager data 230 via logical communication link 294. In some embodiments, logical communication link 212 and logical communication link 294 are the same communication logical communication link.

Although partition 220 is illustrated as including one instance of resource manager data 230, other instances of resource manager 230 (not shown) may exist. However, for clarity and in order to simplify the description, only one of these instances of resource manager data 230 is illustrated.

Resource manager file identifiers 231 can be a record of resource manager file identifiers assigned to files within resource manager 230. As files are created within resource manager 230, resource manager file identifiers assigned as attributes of created files can be added to the record. On the other hand, as files within resource manager 230 are deleted, resource manager file identifiers assigned as attributes of the deleted files can be removed from the record.

It may be that access to resource manager file identifiers 231 is controlled by resource manager module 232. Further, resource manager file identifiers 231 may be stored in a location (e.g. in a directory within resource manager data 230) that is known to resource manager module 232 but is otherwise hidden from users and/or computer systems that send external requests to perform file operations within resource manager data 230. Thus, there is a decreased chance that the resource manager file identifiers stored in resource manager file identifiers 231 could be inappropriately modified.

Log 233 maintains a record of operations (including file operations) that have been flushed from system memory 202. As requests to perform operations within resource manager data 230 are received, log entries (e.g., entries 271, 276, and 281) corresponding to the operations can be written to log 233. More specifically, a log entry can be written to log 233 when a request to perform a file creation operation, file deletion operation, or a file modification operation within resource manager data 230 is received. If data stored at resource manager data 230 (including data in files 250) is lost as the result of a fault, a forward pass through log 233 can be performed to restore the lost data. A forward pass through log 233 can include reconstructing and reapplying file operations indicated in the log entries of log 233 (e.g., file operations 273, 278, and 283). Although illustrated within partition 220, log 233 can be included within any of the partitions in storage 207 or can be stored at a remote computer system.

File table 236 can maintain some file attributes (including file names and file system identifiers) for files stored at partition 220, including files in files 250 and other files 235. When a file is created (e.g., in response to a request from a user or computer system) at partition 220, the created file can be given a file name (e.g., as indicated in the request) and assigned a file system identifier. The file system identifier is assigned by operating system 203 according to the availability of file system identifiers at the time the file is created. An entry that includes the file name and file system identifier can be inserted into the file table 236. When the file is subsequently deleted from partition 220, the file system identifier can be released and the entry for the deleted file removed from file table 236.

Other files 235 represent files stored at partition 220 that are not within resource manager 230. If access to files 250 is prevented due to a fault, operating system 203 or other modules may still be able to access some data on partition 220 including performing file operations on files in other files 235. Thus, files can be created in other files 235, resulting in file system identifiers being assigned as attributes of files, and can be deleted from other files 235, resulting in file system identifiers being released, while access to files 250 is prevented. Similarly, if access to other portions of partition 220 is prevented due to a fault, operating system 203 or other modules may be still be able to access files 250. Thus, files can be created in files 250, resulting in file system identifiers being assigned as attributes of files, and can be deleted from files 250, resulting in file system identifiers being released, while access to other portions of partition 220 is prevented.

Figure 3:
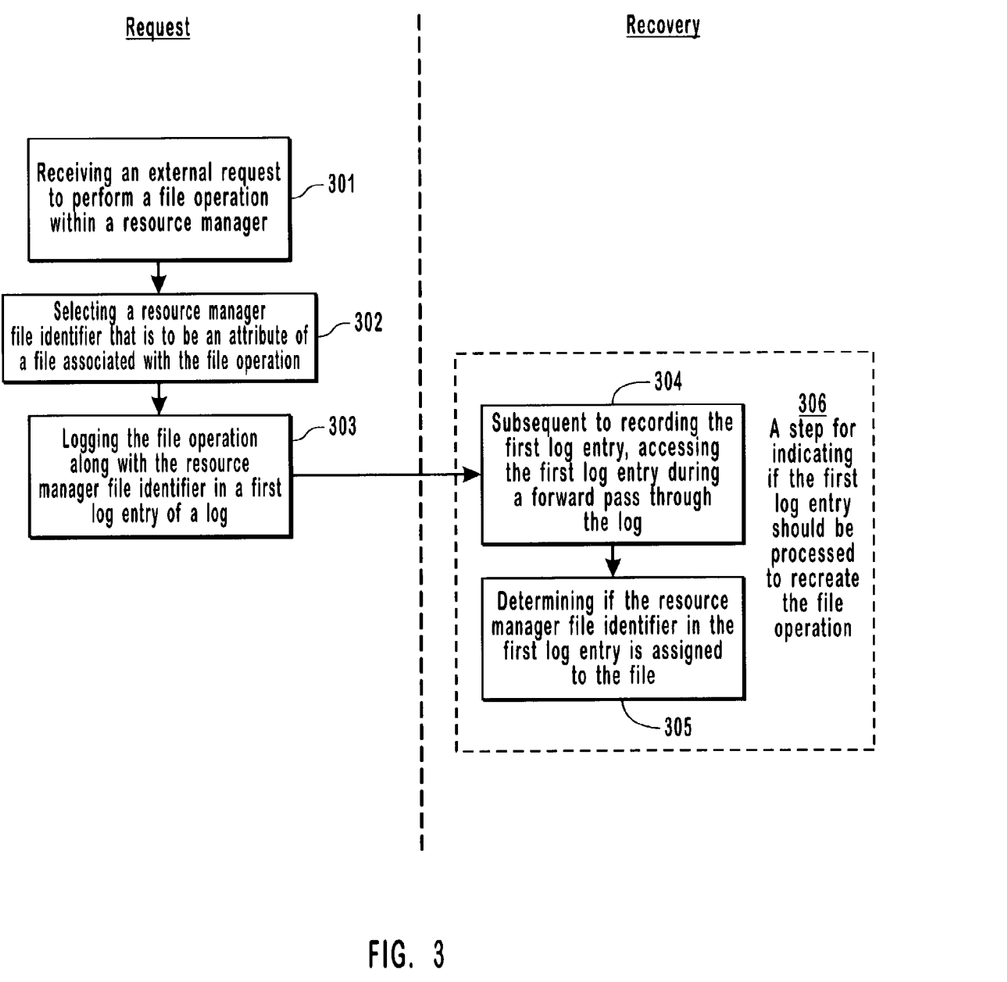
FIG. 3 is a flow diagram illustrating an example of a method for identifying files within a namespace.

FIG. 3 is a flow diagram illustrating an example of a method for identifying files within a namespace. The method of FIG. 3 will be discussed with reference to the functional components of FIG. 2.

The method in FIG. 3 includes an act of receiving an external request to perform a file operation within a resource manager (act 301). An external request from a user or computer system can be received at external interfaces 206, the external request can be transferred, via logical communication link 208, to operating system 203. Operating system 203 can then transfer the request, via logical communication link 213, to resource manager module 232. For example, an external request for a file creation operation can be received at external interfaces 206 and communicated to operating system 203 and resource manager module 232 via appropriate logical communication links.

It may be that the external request is a received transaction that requests performance of one or more file operations within resource manager data 230.

The method in FIG. 3 also includes an act of selecting a resource manager file identifier that is to be an attribute of a file associated with the file operation (act 302). Resource manager module 232 can select resource manager file identifiers for file operations that affect files included in files 250. A selected resource manager file identifier can be maintained in system memory until such time as the resource manager file identifier is flushed to persistent storage (e.g., to storage 207) in a log and/or flushed to persistent storage to be an attribute of a file associated with the file operation. For example, resource manager module 232 may receive a file creation request that, when performed, will result in the creation of file 255. Before performing the file creation operation (and possibly also adding data to file data 256), resource manager module 232 can select a resource manager file identifier that is to be an attribute of file 255 when file 255 is created. The selected resource manager file identifier is then maintained in system memory 202 (e.g., in program data 205) until the resource manager file identifier is flushed to an entry of log 233 and/or to file attributes 257.

It may be that the file operation is one of one or more file operations included in a transaction. Further, the transaction may include file operations that affect one or more files within resource manager data 230. As such, resource manager file identifiers for one or more files associated with the one or more file operations included in the transaction may be selected and maintained in system memory 202.

Resource manager file identifiers can be selected arbitrarily according to user-configurable rules. It may be that resource manager file identifiers are incremented (0001, 0002, 0003, etc.) as file operations are performed on files included in files 250. For example, a resource manager file identifier of 0057 may be selected for a first file associated with a first file operation and a resource manager file identifier of 0058 may be selected for a second file associated with an immediately subsequent second file operation. However, it should be understood that incrementing resource manager file identifiers is merely an example. It would be apparent to one skilled in the art, after having reviewed this description, that a wide variety of used-configurable rules can be implemented to select resource manager file identifiers.

In some embodiments, a link to a known location where resource manager file identifiers are stored, such as, for example, a directory within resource manager data 230, is selected. When performance of a file operation is requested, a resource manager file identifier is selected for storage in the known location and a corresponding link to the known location is selected to be an attribute of an associated file. In these embodiments, the corresponding link includes data that can be used to search the known location.

For example, as a result of receiving a request to perform a file operation, resource manager module 232 may select a resource manager file identifier 005 for storage in resource manager file identifiers 231 and may select a corresponding link of "RMI_005". The resource endanger identifier 005 may be of a numeric data type and the corresponding link "RMI_005" may be of a text data type. During a subsequent search to determine if file 255 exists, the "005" portion of "RMI_005" can be extracted from the link attribute and converted to a numeric value. Resource manager file identifiers 231 can then be searched to determine if the converted numeric value is included in resource manager file identifiers 231. However, it should be understood that resource manager file identifiers with numeric data types and corresponding links with text data types is merely an example. It would be apparent to one skilled in the art, after having reviewed this description, that a wide variety of data types can be implemented when determining if a resource manager file identifier is stored in a known location.

In other embodiments, a direct mapping between resource manager file identifiers and assigned file attributes are included in a lookup table. This offers an increase in performance since there is no need to search (e.g. search a directory or other index) for the resource manager file identifier.

It may be that a resource manager file identifier remains assigned as an attribute of a file until the file is deleted. Then, when the file is deleted, the resource manager file identifier is also deleted or reused for another file. However, it may also be that resource manager file identifiers are scavenged from existing files if the files are not associated with any file operations for some arbitrary period of time. For example, a link scavenger module included in resource manager module 232 may be configured to reclaim resource manager file identifiers from any file in files 250 that has not been associated with a file operation in the last ten minutes. The link scavenger module may check files at a specified interval, such as, for example, once every five minutes. When reclaiming resource manager file identifiers, a link scavenger module may check a log (e.g., log 233) to help ensure that a potentially reclaimable resource manager file identifier is not in a log entry within a current recovery window. That is, the resource manager file identifier is not in a part of the log that might be processed in a recovery (either a forward or reverse pass) after a system fault.

Thus, when checked by the link scavenger module, if file 251 had last been associated with a first file operation eight minutes ago, the link scavenger module may reclaim a first resource manager file identifier (e.g., if the first resource manager file identifier is not in a log entry within a current recovery window) assigned as an attribute of file 251. Subsequent to the first resource manager file identifier being scavenged, file 251 may be associated with a second file operation. When this occurs, a second resource manager file identifier (which may or may not be the same as the first resource manager file identifier) can be selected to be an attribute of file 251. Log 233 can reflect that file 251 was assigned a first resource manager file identifier as an attribute while associated with the first file operation. Likewise, log 233 can reflect that a second resource manager file identifier was selected to be an attribute of file 251 while file 251 is associated the second file operation.

The method in FIG. 3 also includes an act of logging the file operation along with the resource manager file identifier in a first log entry of a log (act 303). This can include resource manager module 232 logging entry 271 in log 233. For example, if a file creation operation is to result in the creation file 251, resource manager module 232 may record that file operation 273 is a file creation operation and that resource manager file identifier 272 is the resource manager file identifier attribute assigned to file 251. Resource manager file identifier 272 can be a link to resource manager file identifiers 231. As other file operations (e.g., file operations 278 and 283) are to be performed on files in files 250, corresponding resource manager files identifiers (e.g., resource manager file identifiers 277 and 282) can be logged in other log entries, such as, for example, entries 276 and 281.

In general, logging an entry can include flushing data from system memory (e.g., Random Access Memory) to persistent storage (e.g., a mass storage device). More specifically in FIG. 2, data (e.g., a selected resource manager file identifier and an indication of a file operation included in external requests) can be flushed from system memory 202 (e.g., from program data 205) to storage 207 (e.g., to log 233). When a transaction includes one or more file operations that are to be performed within resource manager data 230, data can be flushed to a log entry for each of the one or more file operations. It should be understood that other data, in addition to resource manager file identifiers and file operations, may be processed from a log entry to recreate or reapply an operation. Thus, data in addition to resource manager file identifiers and file operations can be flushed from system memory 202 to log 233.

Performing a file operation can also include flushing data from system memory to persistent storage. In FIG. 2, data (e.g., a selected resource manager file identifier and results of a file operation included in external request) can be flushed from system memory 202 (e.g., from program data 205) to storage 207 (e.g., files 250). This can result in a file included in files 250 being created, deleted, or modified, and/or in a selected resource manager file identifier being assigned as an attribute of a file included in files 250. For example, flushing data to file 251 may cause file data 252 to be modified and/or may cause a selected resource manager file identifier to be included in file attributes 253. When a transaction includes one or more file operations that are to be performed within resource manager data 230, data may be flushed to one or more files in files 250.

In some embodiments, data is flushed from system memory 202 to log 233 before data is flushed from system memory 202 to files 250. For example, entry 271 may be flushed from system memory 202 to log 233 and then, at some time subsequent, the results of file operation 273 (including assigning the resource manager file identifier 272 as an attribute of a file) are flushed from system memory 202 to files 250. If a fault occurs after entry 271 is persisted to log 233 but before the results of file operation 273 are persisted to files 250, resource manager file identifier 272 along with the other results of file operation 273 (e.g., a created file or a modification to file data) may be lost. For example, as a result 8 of a power failure the contents of system memory 202 (which still include a selected resource manager file identifier and other results of file operation 273) may be erased. Thus, even though the results of file operation 273 were not persisted to files 250, entry 271 may indicate that file operation 273 was performed.

In embodiments that store resource manager file identifiers in a known location (e.g., resource manager file identifiers 231), a selected resource manager file identifier can be flushed for storage at the known location at essentially the same time a link is flushed for storage as an attribute of a file (e.g., in file attributes 257).

When a plurality of file operations that are to be performed within resource manager data 230 are included in a transaction, log entries for some or all of the plurality of file operations may be flushed to log 233 before data is flushed to any files in files 250. Thus, a log may contain entries for number of file operations before the file operations are actually performed.

At some time after the file operation and the resource manager file identifier are logged in the first log entry (e.g., log entry 271) of the log (e.g., log 233), a forward pass through the log may be performed as part of a recovery. The method in FIG. 3 includes a functional, result-oriented step for indicating if the first log entry should be processed to recreate the file operation (step 306). Step 306 may include any corresponding acts for accomplishing the result of indicating if the first log entry should be processed to recreate the file operation. However, in the illustrated example of FIG. 3, the step 306 includes a corresponding act of, subsequent to logging the first log entry, accessing the first log entry during a forward pass through the log (act 304).

A forward pass through a log can occur as part of a roll-forward recovery to restore resource manager data at a location where the resource manager data was generated. For example, a forward pass through log 233 can be performed to recover resource manager data 230 at partition 220 (either as the same or a different instance). However, it may also be that a forward pass through a log is performed to restore resource manager data to a location other than the location where resource manager data was generated. For example, resource manager data 230 may be restored at a different partition within storage 207 (e.g., partition 240) or at a remote computer system (e.g. remote computer system 183). During the forward pass through log 233, resource manager module 232 may access entry 271 and retrieve resource manager file identifier 272. Resource manager file identifier 272 may be a link to resource manager file identifiers 231.

In the illustrated example of FIG. 3, step 306 includes a corresponding act of determining if the resource manager file identifier in the first log entry is assigned to the file (act 305). This can include determining if the resource manager file identifier was previously flushed form system memory to persistent storage as an attribute of the file. Determining if the resource manager file identifier was flushed to persistent storage can include searching a known location to determine if the resource manager file identifier is included in the known location. For example, resource manager module 232 may search resource manager file identifiers 231 to determine if resource manager file identifier 272 is included in resource manager file identifiers 231. This can include converting a portion of resource manager file identifier 272 into a format that is compatible for searching resource manager file identifiers 231 (e.g., from a text data type to a numeric data type).

When resource manager file identifier 272 is included in resource manager file identifiers 231, this may indicate that resource manager file identifier 272 was flushed from system memory 202 to a file in files 250 (even if the file name attribute of the file has been subsequently changed). As such, processing entry 271 to reconstruct and reapply file operation 273 may be redundant. For example, if file operation 273 were a file creation operation, there would be little benefit to recreating the file when the file is already included in files 250. Since the resource manager file identifier is used to determine if the file exists, there is an increased chance that the file can be identified even if other identifiers associated with the file (e.g., a file name attribute) have been changed.

When the resource manager file identifier 272 is not included in resource manager file identifiers 231, this may indicate that resource manager file identifier 272 was not flushed from system memory 202 to a file in files 250. This can occur, for example, as the result of a fault in environments where data is flushed from system memory to a log before data is flushed from system memory to a corresponding file. In these cases, it may be desirable to process entry 271 to reconstruct and reapply file operation 273.

If a fault also makes resource manager data 230 inaccessible to operating system 203, a roll-forward recovery may be performed to restore access to resource manager data 230. However, the fault making resource manager data 230 inaccessible may not affect other data on partition 220. Other files 235 and file table 236 may be accessed by operating system 203 during the time resource manager data 230 is in accessible. Thus, entries for files created and deleted in other files 235 can have corresponding entries in file table 236 created and removed. As a result, file system identifiers may be manipulated during the time resource manager data 230 is inaccessible. For example, a file system identifier that was allocated by operating system 203 for a file associated with file operation 273 may be released and subsequently assigned to a file in other files 235 during the time resource manager data 230 is inaccessible.

However, since selected resource manager file identifiers are maintained within resource manager data 230 (e.g., stored in resource manager file identifiers 231), there is little, if any, chance that resource manager file identifiers could be selected while resource manager data 230 is inaccessible. Thus, during a roll-forward recovery, there is an increased chance that resource manager file identifier 272 is still available (even if a previously allocated file system identifier is not still available) for assignment to a file associated with file operation 273.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In a computer system including a resource manager configured to maintain a log of file operations that occur at the resource manager and to assign resource manager file identifiers to files manipulated within the resource manager, and wherein assigned resource manager file identifiers are stored within the resource manager, a computer implemented method of processing log entries during a forward pass through a log, the method comprising:

an act of receiving an external request to perform a file operation within the resource manager included in the computer system;

an act of the resource manager selecting a resource manager file identifier that is an attribute of a file associated with the file operation;

an act of recording the resource manager file identifier in a resource manager file identifiers data structure wherein the resource manager file identifiers data structure is available to the resource manager, but hidden to one or more other applications, wherein the resource manager file identifier enables the file associated with the file operation to be identified even when a file name or file system identifier associated with the file associated with the file operation is changed;

an act of logging the file operation along with the resource manager file identifier in a first log entry of a log;

an act of, subsequent to logging the first log entry, accessing the first log entry during a forward pass through the log;

an act of determining that the resource manager file identifier in the first log entry is recorded in the file identifiers data structure, the determination indicative of the file still being stored within the resource manager; and an act of passing over the file operation logged in the first log entry without reapplying the file operation logged in the first log entry during the forward pass through the log to avoid redundantly performing the file operation so as to conserve computer system resources.

2. The method as recited claim 1, wherein the act of receiving an external request to perform a file operation within a resource manager comprises the following:

an act of an external interface receiving a user request to perform a file operation.

3. The method as recited claim 1, wherein the act of receiving an external request to perform a file operation within a resource manager comprises the following:

an act of receiving a request from a computer system component that is external to the resource manager.

4. The method as recited claim 1, wherein the act of receiving an external request to perform a file operation within a resource manager comprises the following:

an act of receiving a request to perform a transaction that includes one or more file operations that are to be performed within the resource manager.

5. The method as recited in claim 1, wherein the act of the resource manager selecting the resource manager file identifier that is an attribute of a file associated with the file operation comprises the following:

an act of selecting a link that references a known storage location within the resource manager where resource manager file identifiers can be stored.

6. The method as recited in claim 5, wherein the act of selecting a link that references a known storage location within the resource manager where resource manager file identifiers can be stored comprises the following:

an act of selecting a link that references a directory within the resource manager.

7. The method as recited in claim 5, wherein the act of selecting a link that references a known storage location within the resource manager where resource manager file identifiers can be stored comprises the following:

an act of selecting a link that can be used to search the known storage location to determine if a resource manager file identifier is stored at the known storage location.

8. The method as recited in claim 1, wherein the act of the resource manager selecting the resource manager file identifier that is an attribute of a file associated with the file operation comprises the following:

an act of selecting a resource manager file identifier that is an attribute of a file associated with a file operation that is one of a plurality of file operations included in a transaction.

9. The method as recited in claim 1, wherein the act of logging the file operation along with the resource manager file identifier in a first log entry of a log comprises the following:

an act of logging the file operation along with a link to a known storage location within the resource manager where resource manager file identifiers can be stored.

10. The method as recited in claim 9, wherein the act of logging the file operation along with a link to a known storage location within the resource manager where resource manager file identifiers can be stored comprises the following:

an act of logging the file operation along with a link to a directory within the resource manager.

11. The method as recited in claim 9, wherein the act of logging the file operation along with a link to a known storage location within the resource manager where resource manager file identifiers can be stored comprises the following:

an act of logging the file operation along with a link that can be used to search the known storage location to determine if a resource manager file identifier is stored at the known storage location.

12. The method as recited in claim 1, wherein the act of logging the file operation along with the resource manager file identifier in a first log entry of a log comprises the following:

an act of logging a file operation that is one of a number file operations included in a transaction along with the resource manager file identifier.

13. The method as recited in claim 1, wherein the act of accessing the first log entry during a forward pass through a log comprises the following:

an act of accessing the first log entry during a roll-forward recovery.

14. The method as recited in claim 1, wherein the act of accessing the first log entry during a forward pass through a log comprises the following:

an act of accessing a resource manager file identifier contained in the log entry.

15. The method as recited in claim 14, wherein the act of accessing the resource manager file identifier contained in the log entry comprises the following:

an act of accessing a link that can be used to search a known storage location to determine if a resource manager file identifier is stored at the known storage location.

16. The method as recited in claim 1, wherein the act of accessing the first log entry during a forward pass through a log comprises the following:

an act of accessing a first log entry that is one of a plurality of log entries associated with a transaction.

17. The method as recited in claim 1, wherein the act of determining if that the resource manager file identifier in the first log entry is assigned to the file comprises the following:

an act of determining that the resource manager file identifier is stored at a known location within the resource manager.

18. The method as recited in claim 17, wherein the act of determining that the resource manager file identifier is stored at a known location within the resource manager comprises the following:

an act of using a link accessed from a log entry to search the known location.

19. The method as recited in claim 18, wherein the act of using a link accessed from a log entry to search the known location comprises the following:

an act of comparing at least a portion of the link to a resource manager file identifier stored at the known location to determine if the at least a portion of the link matches the resource manager file identifier.

20. The method as recited in claim 1, wherein the act of determining that the resource manager file identifier in the first log entry is assigned to the file comprises the following:

an act of a resource manager module determining that the resource manager file identifier is stored at a known location within the resource manager.

21. The method as recited in claim 1, further comprising:

an act of assigning the resource manager file identifier as an attribute of the file.

22. The method as recited in claim 1, further comprising:

an act of accessing a second log entry in the log without processing the first log entry to recreate the logged file operation.

23. In a computer system including a resource manager configured to maintain a log of file operations that occur at the resource manager and to assign resource manager file identifiers to files manipulated within the resource manager, and wherein assigned resource manager file identifiers are stored within the resource manager, a computer implemented method of processing log entries during a forward pass through a log, the method comprising:

an act of receiving an external request to perform a file operation within resource manager included in the computer system;

an act of the resource manager selecting a resource manager file identifier that is an attribute of a file associated with the file operation;

an act of recording the resource manager file identifier in a resource manager file identifiers data structure wherein resource manager file identifiers data structure is available to the resource file manager, but hidden to one or more other applications, wherein the resource manager file identifier enables the file associated with the file operation to be used to identify the file even when a file name or file system identifier associated with the file associated with the file operation is changed;

an act of logging the file operation along with the resource manager file identifier in a first log entry of a log; and a step for indicating how to process the first log entry to transition the resource manager out of an inconsistent state based on the existence of the resource manager file identifier within the resource manager file identifiers data structure during a subsequent forward pass through the log; and an act of processing the first log entry in accordance with the indication of how to process the first log entry based on the existence of the resource manager file identifier within the resource manager file identifiers data structure to transition resource manager out of an inconsistent state.

24. A computer program product for use in a computer system including a resource manager configured to maintain a log of file operations that occur at the resource manager and to assign resource manager file identifiers to files manipulated within the resource manager, and wherein assigned resource manager file identifiers are stored within the resource manager, the computer program product for implementing a method of processing log entries during a forward pass through a log, the method comprising:

one or more computer-readable media carrying computer-executable instructions, that when executed at the computer system, cause the computer system to perform the method, including:

receiving an external request to perform a file operation within a resource manager;

the resource manager selecting a resource manager file identifier that is an attribute of a file associated with the file operation;

recording the resource manager file identifier in a resource manager file identifiers data structure wherein the resource manager file identifiers data structure is available to the resource manager, but hidden to one or more other applications, wherein the resource manager file identifier enables the file associated with the file operation to be identified even when a file name or file system identifier associated with the file associated with the file operation is changed;

logging the file operation along with the resource manager file identifier in a first log entry of a log;

subsequent to logging the first log entry, accessing the first log entry during a forward pass through the log;

determining that the resource manager file identifier in the first log entry is recorded in the file identifiers data structure, the determination indicative of the file still being stored within the resource manager; and an act of passing over the file operation logged in the first log entry without reapplying the file operation logged in the first log entry during the forward pass through the log to avoid redundantly performing the file operation so as to conserve computer system resources.

25. The computer program product as recited claim 24, wherein the one or more computer-readable media include physical storage media.

26. The computer program product as recited claim 24, wherein the one or more computer-readable media include system memory.

27. The method of claim 1, further comprising an act of an operating system associating a file system identifier with the file and subsequently disassociating the file system identifier and wherein the resource manager file identifier remains unchanged as a result of the operating system associating a file system identifier with the file and subsequently disassociating the file system identifier.

28. In a computer system including a resource manager configured to maintain a log of file operations that occur at the resource manager and to assign resource manager file identifiers to files manipulated within the resource manager, and wherein assigned resource manager file identifiers are stored within the resource manager, a computer implemented method of processing log entries during a forward pass through a log, the method comprising:

an act of receiving an external request to perform a file operation within the resource manager included in the computer system;

an act of the resource manager selecting a resource manager file identifier that is an attribute of a file associated with the file operation;

an act of recording the resource manager file identifier in a resource manager file identifiers data structure wherein the resource manager file identifiers data structure is available to the resource manager, but hidden to one or more other applications, wherein the resource manager file identifier enables the file associated with the file operation to be identified even when a file name or file system identifier associated with the file associated with the file operation is changed;

an act of logging the file operation along with the resource manager file identifier in a first log entry of a log;

an act of, subsequent to logging the first log entry, accessing the first log entry during a forward pass through the log;

an act of determining that the resource manager file identifier in the first log entry is not recorded in the file identifiers data structure, the determination indicative of the file not being stored within the resource manager;

an act of selecting the resource manager file identifier in the first log entry as an attribute of another file associated with the file operation in response to determining that the resource manager file identifier in the first log entry is not recorded in the file identifiers data structure; and an act of reapplying the file operation logged in the first log entry to the other file during the forward pass through the log to appropriately manipulate the other file in accordance with the intent of the logged file operation to cause the other file to simulate the state of the file such that further file operations in other log entries can be subsequently reapplied to the other file.

* * * * *